(No Model.) 2 Sheets—Sheet 1.

W. PINCKERT & C. PRUTZ.
RAILROAD CAR COUPLING.

No. 569,668. Patented Oct. 20, 1896.

Witnesses
H. van Oldenneel
E. A. Scott

Inventors
Wilhelm Pinckert
Carl Prutz
by Richard R
Attorneys (No Model.) 2 Sheets—Sheet 2.
W. PINCKERT & C. PRUTZ.
RAILROAD CAR COUPLING.
No. 569,668. Patented Oct. 20, 1896.
Fig. 3.
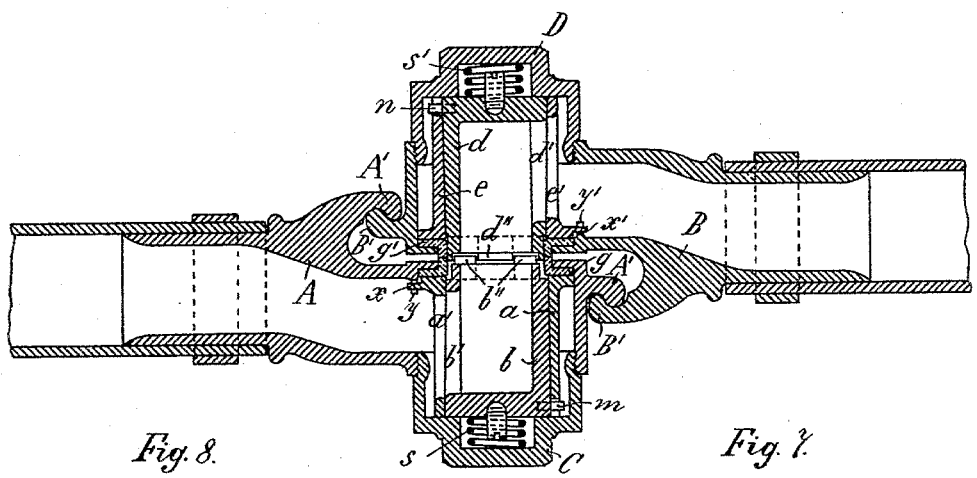
Fig. 8.
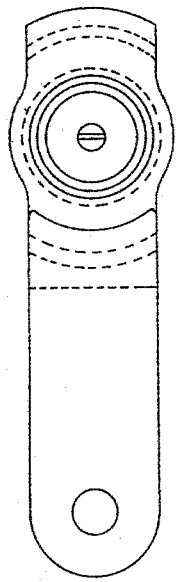
Fig. 4.
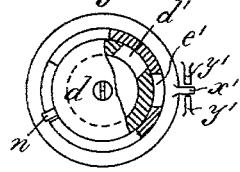
Fig. 5.
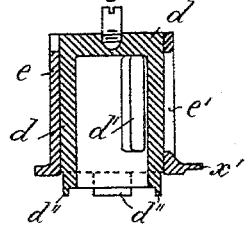
Fig. 6.
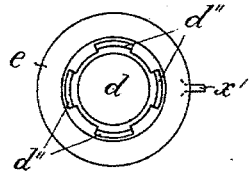
Fig. 7.
Witnesses
H. van Oldenneel
E. P. Scott
Inventors
Wilhelm Pinckert
Carl Prutz
by Richards
Attorneys

UNITED STATES PATENT OFFICE.

WILHELM PINCKERT, OF STETTIN, AND CARL PRUTZ, OF STARGARD, GERMANY.

RAILROAD-CAR COUPLING.

SPECIFICATION forming part of Letters Patent No. 569,668, dated October 20, 1896.

Application filed February 29, 1896. Serial No. 581,234. (No model.)

*To all whom it may concern:*

Be it known that we, WILHELM PINCKERT, of Stettin, and CARL PRUTZ, of Stargard, Germany, have invented certain new and useful Improvements in Railroad-Car Couplings, of which the following is a specification.

The present invention relates to a hose-coupling for air-brakes for railroad-cars of that class in which when the coupling is disconnected the air-pipe is closed automatically, while the passage of air is free when the parts are coupled.

Figure 1:
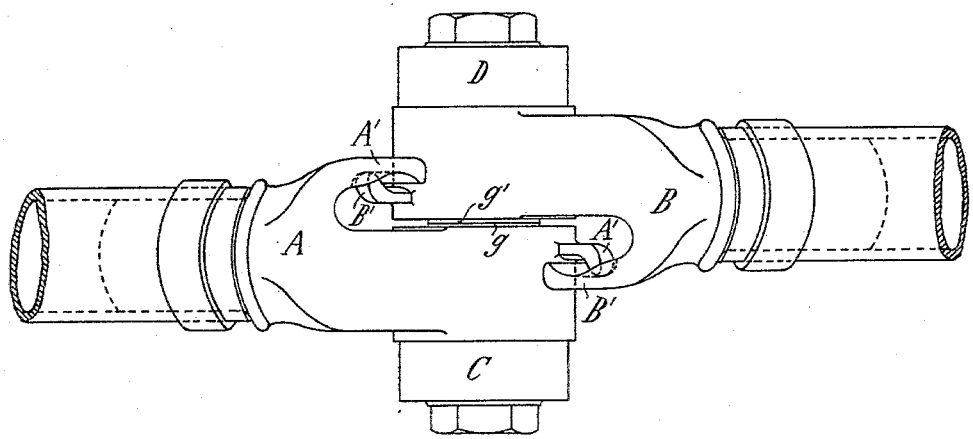
Figure 2:
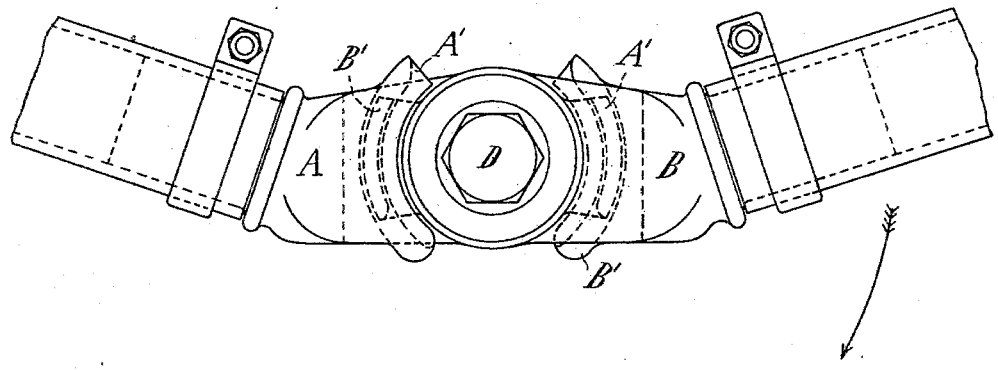

In the accompanying drawings, Figure 1 shows a plan view of the hose-coupling; Fig. 2, a side view of the same when coupled; Fig. 3, a horizontal section of the connection when the hose is coupled and the passage open. Figs. 4, 5, and 6 show the inside parts of a coupling device in plan view, vertical section, and as seen from below; Figs. 7 and 8, a sectional and profile view of the loose coupling, which is inserted in order to prevent the dust from penetrating to the orifice of the coupling when the hose-pieces are not used.

A is one of the metallic coupling-pieces and B the other. They are connected by interlocking parts. The coupling-piece A has two suitably-formed cheeks $A'$ $A'$ and the coupling-piece B two correspondingly-formed cheeks $B'$ $B'$, Figs. 1 and 2, which engage as soon as B is turned in the direction of the arrow and brought to an angle of about ninety degrees with A. If these parts, after having been turned a little, assume the position shown in Fig. 2, the coupling-pieces A and B of the two hose ends are coupled and the connection of the conduit is established.

In order that the extremities of the hose-pieces may close automatically when the coupling is disconnected without the use of a cock or similar device operated by hand, two boxes $a$ $b$, $e$ $d$ are placed inside of each coupling device, held in place by cap-nuts C and D. Each of the boxes has an opening $a'$ or $e'$ at one side, which opening tallies with the cross-section of the pipe. The boxes $a$ and $e$ are placed in their respective coupling-pieces A B by means of projections $x$ $x'$ between cheeks $y$ $y'$ of said coupling-pieces and their openings communicate with the corresponding hose ends, Figs. 3 and 4. Inside of each of these boxes $a$ and $e$ is a box-piece $b$ $d$, having an opening of corresponding size $b'$ $d'$, and in order that the closure may be kept tight the pieces are cone-shaped. At the sides, turned one toward the other, the boxes $b$ and $d$ are provided with joint-pieces $b''$ $d''$, so that when the two coupling-pieces A and B are placed one upon the other, in order to effect the coupling, these joint-pieces engage, as shown in Fig. 3, and form practically one piece. In order that these joint-pieces may close tightly, so that no air can escape, the material of each of these joint-pieces $b''$ or $d''$ is worked out partly toward the inside, so that when they engage they form a closed ring with tight joints.

In order to form a perfectly air-tight closure between the coupling-pieces A and B, an angular flexible packing-disk $g$ $g'$ is used. These packing-disks can be arranged in any other suitable manner and may be given another shape.

In order to assure a perfect fit of the inside coupling-pieces and make the joint-pieces $b''$ and $d''$ of the boxes $b$ and $d$ thoroughly engage when the coupling is effected, the box parts are provided with striking-pegs $m$ $n$, Figs. 3 and 4, which catch in grooves or slots of certain length in the boxes $a$ and $e$ and strike as soon as the latter are turned with the coupling-pieces A and B. When the coupling-pieces A and B assume a horizontal position, as shown in Figs. 2 and 3, the opening $b'$ will each time turn against $a'$ and the opening $d'$ against $e'$. When, however, they assume the position when B is turned in the direction of the arrow and is at an angle of about ninety degrees with A, the opening $a'$ will be displaced against $b'$ and the opening $e'$ against $d'$, Figs. 4 and 5, and thereby all communication between the two will be cut off and the hose extremities are closed. In order that the inside parts of each coupling-piece press one against the other at a certain degree of pressure, springs $s$ $s'$ are inserted in the cap-nuts C D, which assure a close friction of the inside parts. Thus the closure will be effected when A and B are disconnected, and when A and B are connected there will be an open passage. In order to make the operation as simple as possible and notwithstanding that to assure a safe working of the automatic closing or opening of the coupling, the inside parts of the coupling-pieces are connected so that when two hose-pieces provided with the same are coupled the latter are held high, after which the joint-pieces $b''\ d''$ are pressed the one into the other. Then the cheeks A' and B' are ready to engage, and after this the hose extremities are pressed down. The free passage through the connected pieces will thereby be established. It will also be at that point that the proof can be had that the air-brake is ready for work.

It is obvious that this system of coupling can be used for all hose-pipes.

Figs. 7 and 8 show a loose coupling which is placed over the orifice of the coupling-piece in order to prevent the penetrating of the dust or other impurities when not used.

We claim—

In a train-pipe coupling, the two coupling-pieces A, B, with interlocking parts, each coupling-piece having a removable screw-cap, a hollow valve-box in each coupling-piece, each valve-box having an opening laterally and having a pin $x$ fitting between cheeks to hold the box in place, the hollow rotary valves within the valve-boxes having lateral openings, the pin-and-groove connection between each valve-box and valve, the said valves having interlocking parts and the springs within the caps pressing upon the valves, substantially as described.

WILHELM PINCKERT.
CARL PRUTZ.

Witnesses:
F. W. KICKBUSCH, Jr.,
M. WEGNER.